(No Model.) 2 Sheets—Sheet 2.

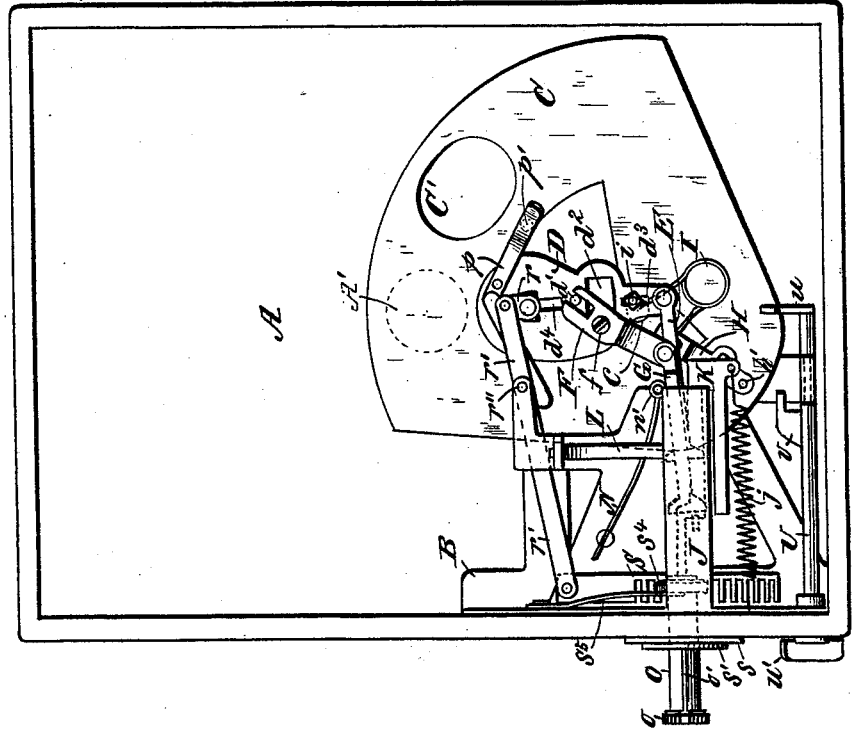

L. F. EIDEN.
CAMERA SHUTTER.

No. 519,247. Patented May 1, 1894.

Witnesses.
Robert Emmett,
G. W. Rea,

Inventor
Leo F. Eiden.
By James L. Norris
Atty,

THE NATIONAL LITHOGRAPHING COMPANY,
WASHINGTON, D. C.

UNITED STATES PATENT OFFICE.

LEO F. EIDEN, OF EAST WARREN, PENNSYLVANIA.

CAMERA-SHUTTER.

SPECIFICATION forming part of Letters Patent No. 519,247, dated May 1, 1894.

Application filed December 29, 1893. Serial No. 495,110. (No model.)

*To all whom it may concern:*

Be it known that I, LEO F. EIDEN, a citizen of the United States, residing at East Warren, in the county of Warren and State of Pennsylvania, have invented new and useful Improvements in Camera-Shutters, of which the following is a specification.

My invention relates to improvements in camera shutters; and has for its object to provide a shutter that shall at all times be ready for making an exposure; to provide means for regulating the speed of the exposure; to provide means for making an instantaneous or time exposure; to provide means for effecting the exposure by pressure on a button; to provide means for preventing rebound or vibration of the shutter; to dispense with all winding and setting mechanism; and to so construct and arrange the mechanism as to produce an extremely light, compact, and portable device adapted to operate in the manner specified.

To these ends my invention consists in the novel construction, arrangement, and combination of parts, hereinafter fully described, and finally definitely pointed out in the claims following the description, due reference being had to the accompanying drawings, forming a part of this specification, wherein—

Figure 6:
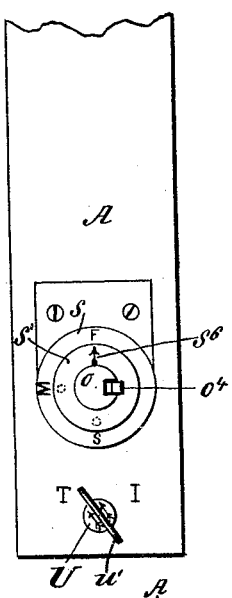
Figure 7:
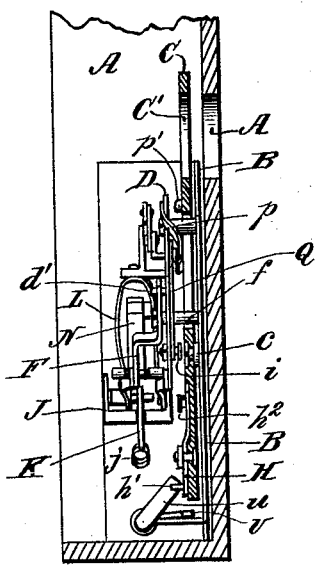
Figure 5:
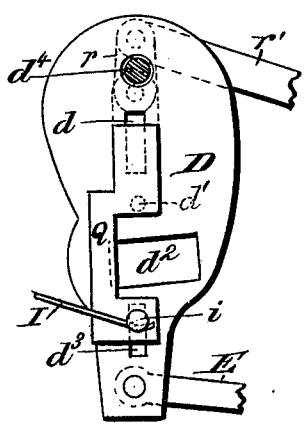
Figure 3:
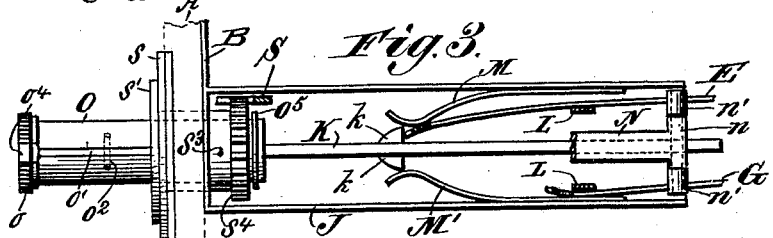
Figure 4:
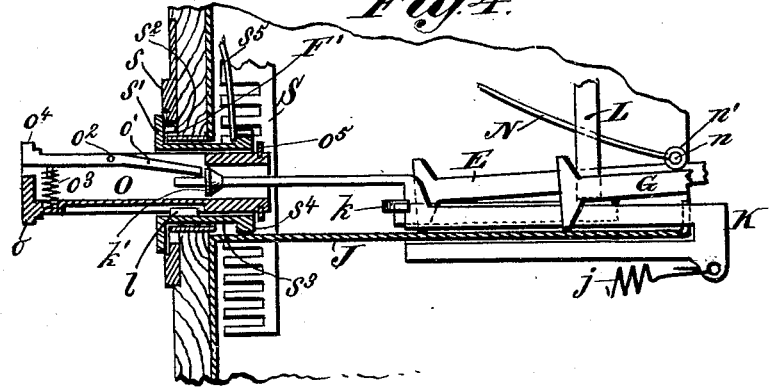
Figure 8:
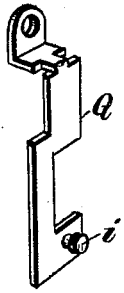

Figure 1 is a front elevation of my improved shutter, the front of the casing being removed. Fig. 2 is a similar view, showing the shutter in its reverse position. Fig. 3 is a top plan view of the push button and the push rods. Fig. 4 is a vertical central section through the push button. Fig. 5 is a bottom plan view of the plate D. Fig. 6 is a detail end view of the push button and time exposure knob. Fig. 7 is a vertical central section, the parts being shown in the position assumed while making a timed exposure, and Fig. 8 is a detail perspective view of the slide plate Q.

Referring to the drawings the letter A indicates the shutter case, and B a light metallic frame carrying the shutter and its operating mechanism and secured to the interior of the casing A.

C indicates the shutter, consisting preferably of a hard rubber plate of the shape shown and provided with an oblong aperture C', which is adapted to pass over the lens opening A' as the shutter is swung from one to the other of its two opposite positions to make an exposure. The shutter C swings about a pivot $c$ secured to the frame B, and preferably consisting of a screw, and is cut away at its center to permit of the passage of fastening devices for securing parts of the mechanism to the frame B.

D indicates a thin metallic plate pivoted to the frame B near its top by a pivot $d$, and at its lower end is pivotally connected to a push-rod E, by means of which said plate is caused to oscillate upon its pivot, as hereinafter described. At or near its center the plate D is provided with a projecting pin $d'$, which is engaged by the bifurcated end of a pivoted lever F which is pivoted to the frame B by a pivot pin $f$ which passes through an elongated slot $d^2$ in the plate D and through an opening $C^2$ in the shutter C, as more clearly shown in Figs. 2 and 7. The opposite end of the lever F is pivotally connected to a push-rod G adapted to oscillate the shutter C in an opposite direction to the push-rod E.

To the bottom of the shutter C and in line with its longitudinal center is secured a thin metallic arm H, by means of screw $h$ and a pin or peg $h'$. The arm H, at its free end carries a stud $h^2$, to which is secured one end of a spring I, the other end of said spring being secured to a small bolt $i$ adjustably secured to the plate D in the manner and for the purpose hereinafter described. The spring I is formed of light steel wire substantially U-shaped and coiled at its center, and as the plate D, carrying the bolt $i$ to which one end of the spring is secured, is oscillated from side to side upon its pivot $d$, said spring is compressed until its end carried by the bolt $i$ has passed the longitudinal center of the shutter when the spring expands, oscillating the shutter upon its pivot $c$. The mechanism for oscillating the plate D will now be described.

To the frame B is secured a flanged guideway J on which is adapted to slide a slotted push-arm K, to the inner end of which is secured one end of a coiled spring $j$, the other end of said spring being secured to the frame B. The push-arm K, upon its opposite sides, is provided with lugs or projections $k$, $k$, adapted to alternately engage the ends of the push-rods E, G, as the push-arm K is thrust inwardly, and in order to prevent one of the rods E, G, from engaging one of the lugs $k$ as the arm K is forcing the other rod inward, I provide a U-shaped spring L which is secured at its center to the frame B, the free ends of said spring bearing against the adjacent sides of the rods E, G, and operating to force the ends of said rods out of the path of the lugs $k, k$; and in order to cause said rods E, G, to be alternately engaged by the lugs $k, k$, as the arm K is pushed inward, I provide two springs M M', secured respectively to the frame B and guide-way J, the free ends of said springs being bent inwardly toward the lugs $k, k$, and operating to force the ends of the rods E, G, into engagement with said lugs, as hereinafter described.

In practice I prefer to slightly notch or recess the sides of the lugs $k, k$, that engage the arms E, G, to insure said lugs positively engaging the said arms as the bar K is thrust forward, and prevent all tendency of the springs L L causing the arms to disengage the lugs before the shutter has been oscillated. While this is a desirable way of forming the lugs $k, k$, it is not absolutely essential.

To the frame B is secured one end of a flat spring N which carries at its other end a cross-bar $n$, provided with anti-friction rollers $n'$, which bear upon the push-rods E, G, and hold their ends depressed in position to be engaged by the lugs $k, k$.

Projecting through one side of the casing A is a cylinder O, provided at its outer extremity with a push-button $o$, said cylinder being slipped over the end of the push-arm K and adapted to slide thereon. Said cylinder and button are slotted upon one side for the reception of a detent $o'$, which is pivoted in said slot at $o^2$, and its inner end engages a collar $k'$ formed near the outer end of the push-arm K. A spring $o^3$ is secured to the detent $o'$ and operates to normally maintain the inner end of the detent in engagement with the collar $k'$ on the push-arm K. The outer end of the detent $o'$ is provided with a projection $o^4$, and by pressing upon said projection the detent is caused to disengage the collar $k'$, when the cylinder O may be pushed in the casing A so as to be out of the way in transportation. A collar $o^5$ is secured on the inner end of the cylinder and presents its entire withdrawal from the casing A.

Constructed as above described, the operation of my improved shutter is as follows: Let it be supposed that the cylinder has been pushed in the casing A out of the way. The operator pulls out the cylinder until the inner end of the detent $o'$ is in engagement with the collar $k'$. The shutter is now ready for operation, and the parts are in the position, say, shown in Fig. 1. To make an exposure the operator has only to press in the button $o$, and, as the detent $o'$ engages the collar $k'$, the push-arm K is forced inward. As the arm K moves inward the lug $k$ engages the end of the push-rod E and forces it inward also and causes the plate D to swing to the right about its pivot $d$. As the plate D is thus swung to one side the spring I is gradually compressed until the bolt $i$, to which one end of the spring is secured, passes the longitudinal center of the shutter, when the spring expands and causes the shutter to swing on its pivot $c$ to the right, and during this movement the aperture C' passes before the lens opening A' and makes an instantaneous exposure. As the plate D was swung about its pivot, as above described, the pin $d'$ acted to rock the lever F to the position shown in Fig. 2, thus forcing the push-rod G to the left, and during this movement the spring L forced the end of the push-rod G away from the arm K and out of the path of its lug $g$, until the end of the movement had nearly been completed when the spring M forced the end of the rod G toward the arm K in a position to be engaged by the lug after the push-arm K had been returned to its original position by the spring $j$. After the exposure has been made the shutter is in position for another exposure without the necessity of resetting or manipulation of any sort other than again pushing in the button. As the button is again pushed in the arm K forces in the push-rod E which causes the lever F to swing upon its pivot $f$, and in turn swing the plate D to the left. As said plate is thus swung about its pivot the spring I is actuated as before described and swings the shutter C upon its pivot $c$ to make a second exposure. The shutter may thus be repeatedly operated to make an indefinite number of instantaneous exposures by simply pressing in the button.

I have described the shutter opening as being oblong, and I prefer such a form because it affords an equal exposure to every portion of the plate.

In order to provide against vibration or rebound of the shutter, I rivet to the upper portion of the plate D a leaf-spring $p$, the ends of which extend in opposite directions and are bent downward slightly, and alternately engage a projection $p'$ on the shutter C as the latter is swung back and forth upon its pivot, said springs acting to gradually retard the movement of the shutter toward the end of its movement in either direction and prevent its rebounding after having made an exposure.

In order to make the speed of the shutter either rapid, slow, or medium, I have devised mechanism constructed and operating as follows: The plate D is provided with two elongated slots $d^3, d^4$, through the former of which passes the bolt $i$ to which the spring I is secured. The bolt $i$ is secured to one end of a slide plate Q arranged upon the under side of the plate D, the other end of said plate Q being bent up at a right angle and extending through the slot $d^4$, and is pivotally connected to a link $r$, which in turn is similarly connected to one end of a lever $r'$, pivoted to the frame B at $r''$, and at its other end pivotally connected to the upper end of a rack-bar S. To the side of the casing A, and surrounding the cylinder O, is secured a disk $s$, a second disk $s'$ being superimposed thereon and provided upon its rear side with a pin $s^2$ adapted to engage perforations formed in the disk $s$ to lock it thereto. The disk $s'$ is carried by a cylinder $s^3$ journaled on the cylinder O and projecting slightly into the interior of the casing A, and having secured to its inner end a pinion $s^4$ against which bears the free end of a flat spring $s^5$, which at its other end is secured to the frame B and serves to keep the pin $s^2$ in engagement with the disk $s$, while at the same time permitting the cylinder $s^3$ to be partially withdrawn to disengage said pin. The pinion $s^4$ engages the rack-bar S to actuate the speed governing mechanism, as follows: The disk $s$ is provided with three perforations adapted to be engaged by the pin $s^2$, and with symbols or letters, as F, M, S, to indicate the speed of the shutter, as fast, medium, or slow, when the pin $s^2$ is in engagement with one or the other of said perforations. Let it be assumed that the parts are in the position shown in Fig. 1. The bolt $i$ will then be in its nearest position to the pivotal point of the plate D, and the shutter will be operated at its slowest speed. If now a greater speed is desired, the button $o$ is pulled out from the casing and, by means of the collar $o^5$, draws out the cylinder $s^3$ and disengages the pin $s^2$ from the disk $s$. The button $o$ is now turned in the proper direction, and by means of a feather $l$ carried by the cylinder $s^3$, and engaging a slot in the cylinder O, the cylinder $s^3$ is rotated until an index hand $s^6$, carried by the disk $s'$, and in line with the pin $s^2$, is opposite the perforation indicated by the letter M, when the spring $s^5$ will retract the cylinder $s^3$ and cause the pin to engage the perforation in the disk $s$ and lock the cylinder $s^3$ against further rotation. In turning the cylinder $s^3$ the pinion $s^4$ engaged the rack-bar S and raised the same a slight distance, which movement, through the medium of the lever $r'$ and link $r$, forced the slide plate Q downward, or away from the pivotal point of the plate D, thus slightly compressing the spring I and increasing its tension, correspondingly increasing the speed of the shutter. The maximum speed may be similarly attained by turning the button $o$ until the index arrives opposite the perforation on the disk $s$ indicated by the letter F, thus further compressing the main spring I.

There now remains to be described the mechanism for effecting a time exposure. Mounted in bearings in the frame B is a rocking rod U, provided with a hooked end $u$, its other end extending through the casing A and being provided with a knob $u'$. The said rod has secured to it a lug or stop $v$ adapted to come in contact with the frame B and limit the rotation of the rod. When it is desired to make time exposure the rod U is turned axially until stopped by the lug $v$, thus bringing the hooked end $u$ in the path of the peg $h'$ carried by the shutter C. By pressing the button $o$, the shutter is actuated in the same manner as in making an instantaneous exposure, but at the moment the shutter-opening C' registers with the lens opening A' the peg $h'$ abuts against the hooked end $u$ of the rod U, and the motion of the shutter is arrested. The shutter is permitted to remain in this position until the desired exposure has been given, when the button $o$ is again pushed in and the mechanism actuated to swing the shutter back in the reverse direction, as in making instantaneous exposures.

The mechanism for throwing or oscillating the shutter is the same as that before described for effecting an instantaneous exposure, and the operation precisely the same, the motion of the shutter being simply arrested by turning the rod U so as to bring its hooked end $u$ in the path of the peg $h'$ carried by the shutter C, and the shutter thus held with its aperture C' in front of or uncovering the lens opening until the button $o$ is again pushed in to swing the shutter back to its original position.

Having described my invention, what I claim is—

1. In a camera shutter, the combination of an oscillating shutter, a pivoted plate, a bent spring secured at one end to the shutter and at its other end to the plate, push-rods operating to rock said plate in opposite directions, and a push-button for actuating said push-rods, substantially as described and for the purpose specified.

2. In a camera shutter, the combination of an oscillating shutter, a pivoted plate, a bent spring secured at its opposite ends to said shutter and plate, push-rods operating to alternately rock said plate in opposite directions, and a push-button for alternately actuating each of said push-rods at each inward thrust, substantially as described and for the purpose specified.

3. In a camera shutter, the combination of an oscillating shutter, a pivoted plate, a bent spring secured at its opposite ends to said shutter and plate, push-rods operating to alternately rock said plate in opposite directions, a push button for alternately actuating each of said push-rods at each inward thrust, and means for regulating the speed of the shutter, substantially as described.

4. In a camera shutter, the combination of an oscillating shutter, a pivoted plate, a bent spring secured at one end to the shutter and adjustably connected at its other end to the pivoted plate, push-rods operating to alternately rock said plate in opposite directions, a push-button for alternately actuating each of said push-rods at each inward thrust, and mechanism controlled by the push-button for adjusting the point of connection between said spring and the pivoted plate, substantially as described and for the purpose specified.

5. In a camera shutter, the combination of an oscillating shutter, a pivoted plate, a bolt adjustably secured to said plate, a bent spring secured at one end to the shutter and at the other end to said bolt, a push-button and push-rods for actuating said spring to oscillate the shutter, and means for adjusting the said bolt relatively to said plate to vary the tension of the spring, substantially as described.

6. In a camera shutter, the combination of an oscillating shutter, a pivoted plate carrying an adjustable bolt, a bent spring connected at its opposite ends to said bolt and plate, a push-button and push-rods for actuating said spring to oscillate the shutter, and means controlled by said button for adjusting the bolt relatively to the plate to vary the tension of the spring, substantially as described.

7. In a camera shutter, the combination of an oscillating shutter, a spring acting to oscillate said shutter in opposite directions, a push-button and push-rods for actuating said spring, and means, substantially such as described, for varying the tension of said spring, for the purpose specified.

8. In a camera shutter, the combination of an oscillating shutter, a spring acting to oscillate said shutter, means for actuating said spring, a projection carried by the shutter, and a rocking rod provided with a hooked end adapted to be turned into the path of said projection to arrest the motion of the shutter and having a projecting lug to limit the movement of the rod, substantially as described.

9. In a camera shutter, the combination of an oscillating shutter, a pivoted plate, a bent spring secured at its opposite ends to said shutter and plate, means for rocking said plate in opposite directions, a spring secured to said plate and having outwardly and downwardly projecting ends, and a projection carried by the shutter and adapted to alternately engage the opposite ends of said spring, substantially as described.

10. In a camera shutter, the combination of an oscillating shutter, a pivoted plate acting to oscillate said shutter in opposite directions, means for rocking said plate, a spring secured to said plate and extending on each side thereof, and a lug carried by said shutter, the ends of said spring alternately engaging said lug as the shutter oscillates in opposite directions, substantially as and for the purpose specified.

11. In a camera shutter, the combination of an oscillating shutter, a pivoted plate, a bent spring secured at its opposite ends to said shutter and plate, a push-rod connected to said plate, a pivoted lever at one end engaging said plate, a push-rod connected to the opposite end of said lever, and a push-button adapted to alternately engage said push rods, substantially as described.

12. In a camera shutter, the combination of an oscillating shutter C, the pivoted plate D, a push-rod E connected to said plate, a pivoted lever F bifurcated at one end and engaging a pin $d'$ on the plate D, a push-rod G connected to the other end of said lever, means for alternately reciprocating said rods, and a spring I secured at its opposite ends to the plate D and shutter C, substantially as described.

13. In a camera shutter, the combination of an oscillating shutter C, a pivoted plate D, a bent spring secured at its opposite ends to said shutter and plate, a pivoted lever F loosely connected at one end to the plate D, push-rods connected to the plate D and lever F, and a push-arm K provided with lugs $k, k$, arranged to alternately engage said push-rods, substantially as described.

14. In a camera shutter, the combination of an oscillating shutter C, a pivoted plate D, a bent spring I secured at its opposite ends to said shutter and plate, a pivoted lever F loosely connected at one end to the plate D, push-rods E, G, pivotally connected to the plate D and lever F, a push-arm K provided with lugs $k, k$, for actuating said push-rods, and springs arranged to cause the said push-rods to first recede from and then approach the lugs $k, k$, substantially as described, and for the purpose specified.

15. In a camera shutter, the combination of an oscillating shutter C, a pivoted plate D, a bent spring I secured at its opposite ends to said shutter and plate, a pivoted lever F loosely connected at one end to the plate D, push-rods E, G, pivotally connected to plate D and lever F, a push-arm K provided with lugs $k, k$, for actuating said push-rods, springs arranged to cause the said push-rods to first recede from and then approach the lugs $k, k$, a button for moving the push arm K in one direction and a spring $j$ for retracting it, substantially as described.

16. In a camera shutter, the combination of an oscillating shutter C, a pivoted plate D, a bent spring I secured at its opposite ends to said shutter and plate, a pivoted lever F loosely connected at one end to the plate D, push-rods E, G, pivotally connected to plate D and lever F, a push-arm K provided with lugs $k, k$, springs arranged to cause the said push-rods to first recede from and then approach said lugs, and a spring N carrying at its free end anti-friction rollers $n'$ bearing on the upper side of said push-rods, substantially as described and for the purpose specified.

17. In a camera shutter, the combination of the oscillating shutter C, a spring adapted to oscillate said shutter in opposite directions, push-rods E, G, arranged to alternately actuate said spring, a push-arm K provided with lugs $k, k$ arranged to alternately engage said push-rods, a button sliding on said push-arm, and means for locking said button to said push-arm, substantially as and for the purpose specified.

18. In a camera shutter, the combination of the oscillating shutter C, a spring adapted to oscillate said shutter in opposite directions, push-rods E, G, arranged to alternately actuate said spring, a push-arm K provided with lugs $k, k$, arranged to alternately engage said push-rods, a collar $k'$ on said push-arm, a button sliding on said push-arm and provided with a detent $o'$ adapted to engage the collar $k'$, substantially as described and for the purpose specified.

19. In a camera shutter, the combination of an oscillating shutter C, a spring I for oscillating said shutter, means for actuating said spring, a slide Q, a bolt $i$ connecting said slide and one end of the spring I, a pivoted lever $r'$ connected at one end to said slide, a rack-bar $s$ connected to the other end of said lever, and a pinion $s^4$ for actuating said rack-bar to adjust the tension of the spring, substantially as described.

20. In a camera shutter, the combination of an oscillating shutter C, a spring I for oscillating said shutter, means for actuating said spring, a rack-bar S, and attached mechanism for adjusting the tension of said spring, a pinion $s^4$ gearing with said rack-bar, a stationary perforated disk $s$ on the outside of the shutter casing, a rotatable disk $s'$ superimposed upon the disk $s$ and provided on its rear side with a pin $s^2$ adapted to engage the perforations in the disk $s$, the said disk $s'$ and pinion $s^4$ being rigidly connected together, and a button adapted to disengage said disk and rotate said pinion, substantially as described and for the purpose specified.

21. In a camera shutter, the combination of an oscillating shutter C, a spring I for oscillating said shutter, means for actuating said spring, a rack-bar S, and attached mechanism for adjusting the tension of said spring, a pinion $s^4$ gearing with said rack-bar and rigidly connected with a disk $s'$ carrying an index hand and provided on its rear side with a pin $s^2$, a stationary disk $s$ arranged beneath the disk $s'$ and provided with perforations adapted to be engaged by the pin $s^2$, a button adapted to disengage said disks and rotate the pinion, and a spring for forcing said disks into engagement, substantially as described and for the purpose specified.

In testimony whereof I have hereunto set my hand and affixed my seal in presence of two subscribing witnesses.

LEO F. EIDEN. [L. S.]

Witnesses:
 GEORGE REIG,
 A. C. KISBERGER.